US011520827B2

(12) United States Patent
Pamarthi et al.

(10) Patent No.: US 11,520,827 B2
(45) Date of Patent: Dec. 6, 2022

(54) CONVERTING UNLABELED DATA INTO LABELED DATA

(71) Applicant: Dell Products L. P., Round Rock, TX (US)

(72) Inventors: Sirisha Pamarthi, Austin, TX (US); Rajitha Katikareddy, Austin, TX (US); Muhammad Anadil Furqan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 691 days.

(21) Appl. No.: 16/528,990

(22) Filed: Aug. 1, 2019

(65) Prior Publication Data

US 2020/0394398 A1 Dec. 17, 2020

Related U.S. Application Data

(60) Provisional application No. 62/861,699, filed on Jun. 14, 2019.

(51) Int. Cl.
  *G06F 16/901* (2019.01)
  *G06F 16/34* (2019.01)
  *G06Q 30/06* (2012.01)

(52) U.S. Cl.
  CPC .......... *G06F 16/901* (2019.01); *G06F 16/345* (2019.01); *G06Q 30/0633* (2013.01)

(58) Field of Classification Search
  None
  See application file for complete search history.

(56) References Cited

U.S. PATENT DOCUMENTS

| | | | |
|---|---|---|---|
| 2013/0318110 A1* | 11/2013 | Develyn | G06F 16/90 707/755 |
| 2014/0064618 A1* | 3/2014 | Janssen, Jr. | G06F 40/211 382/182 |
| 2016/0092423 A1* | 3/2016 | Wilczek | G06V 30/412 715/223 |
| 2017/0212910 A1* | 7/2017 | Morris | G06F 16/5838 |
| 2018/0025222 A1* | 1/2018 | Yellapragada | G06Q 40/123 382/176 |
| 2020/0005258 A1* | 1/2020 | Miller | G06Q 20/102 |
| 2020/0250263 A1* | 8/2020 | Rimchala | G06N 3/02 |

* cited by examiner

*Primary Examiner* — Scott A. Waldron
(74) *Attorney, Agent, or Firm* — Krishnendu Gupta; Deepika Bhayana; Lesley A. Leonessa

(57) ABSTRACT

In some examples, a computing system may receive a document comprising a paragraph associated with a purchase order. The paragraph may be converted into text. The computing system may use a parser to parse the text to identify particular portions associated with address-related information. The computing system may parse the text based on a pre-determined sequential order and also may remove the particular portions from the text based on the pre-determined sequential order. The computing system may then label and store the particular portions in fields of a data structure.

20 Claims, 7 Drawing Sheets

CONVERTING UNLABELED DATA INTO LABELED DATA

CROSS-REFERENCE TO RELATED APPLICATION

This application claims the benefit of U.S. Provisional Patent Application No. 62/861,699, filed Jun. 14, 2019, which is incorporated by reference herein in its entirety.

BACKGROUND

Field of the Invention

The present invention relates generally to electronic data records, and more particularly to methods, devices, and systems of automating extraction, organization, and display of data (e.g., electronic address data records) by converting unlabeled data into labeled data.

Description of the Related Art

As the value and use of information continues to increase, individuals and businesses seek additional ways to process and store information. One option available to users is information handling systems (IHS). An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

When a customer places an order for one or more items, an invoicing system executed by an IHS may generate a purchase order (also known as an invoice) that includes billing, shipping and/or mailing addresses of the customer. In particular, a "ship to" paragraph may be included in the purchase order and may be used by a merchant to fulfill the purchase order by sending the items to a "ship to" address identified in the "ship to" paragraph. Different purchase orders may use different formats. For example, the format followed by a company may be different than the format followed by another company. In a large company, one department may follow a different format than another department. Even individuals in the same department may each use a different format. Thus, the "ship to" paragraph in different purchase orders may have inconsistent formats for the different data fields, making it difficult to (i) distinguish between company names and contact names, (ii) distinguish between zip codes, phone numbers, and purchase order numbers, (iii) identify states due to inconsistent state name formats in abbreviated or full form, (iv) distinguish between phone numbers with or without extensions, (v) identify street numbers in inconsistent street number formats and inconsistent street name formats (e.g., in abbreviated or full form), and the like. In addition, the records may have additional location information, such as floor and department information. Such inconsistencies may cause significant problems for a merchant that receives hundreds or thousands of orders per day and is using an electronic records system in which each field in the address is distinctly identified and labeled.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a computing system may receive a document including a paragraph associated with a purchase order. The paragraph may be converted into text. The computing system may use a parser to parse the text to identify particular portions associated with address-related information. The parsing may include using a machine learning module to classify particular portions of the paragraph as particular fields, identification of particular fields using delimiters, determining whether portions of the paragraph match a regular expression, another parsing technique, or any combination thereof. For example, the computing system may parse the text based on a pre-determined sequential order and may remove the particular portions from the text based on the pre-determined sequential order. The computing system may then label and store the particular portions in fields of a data structure.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
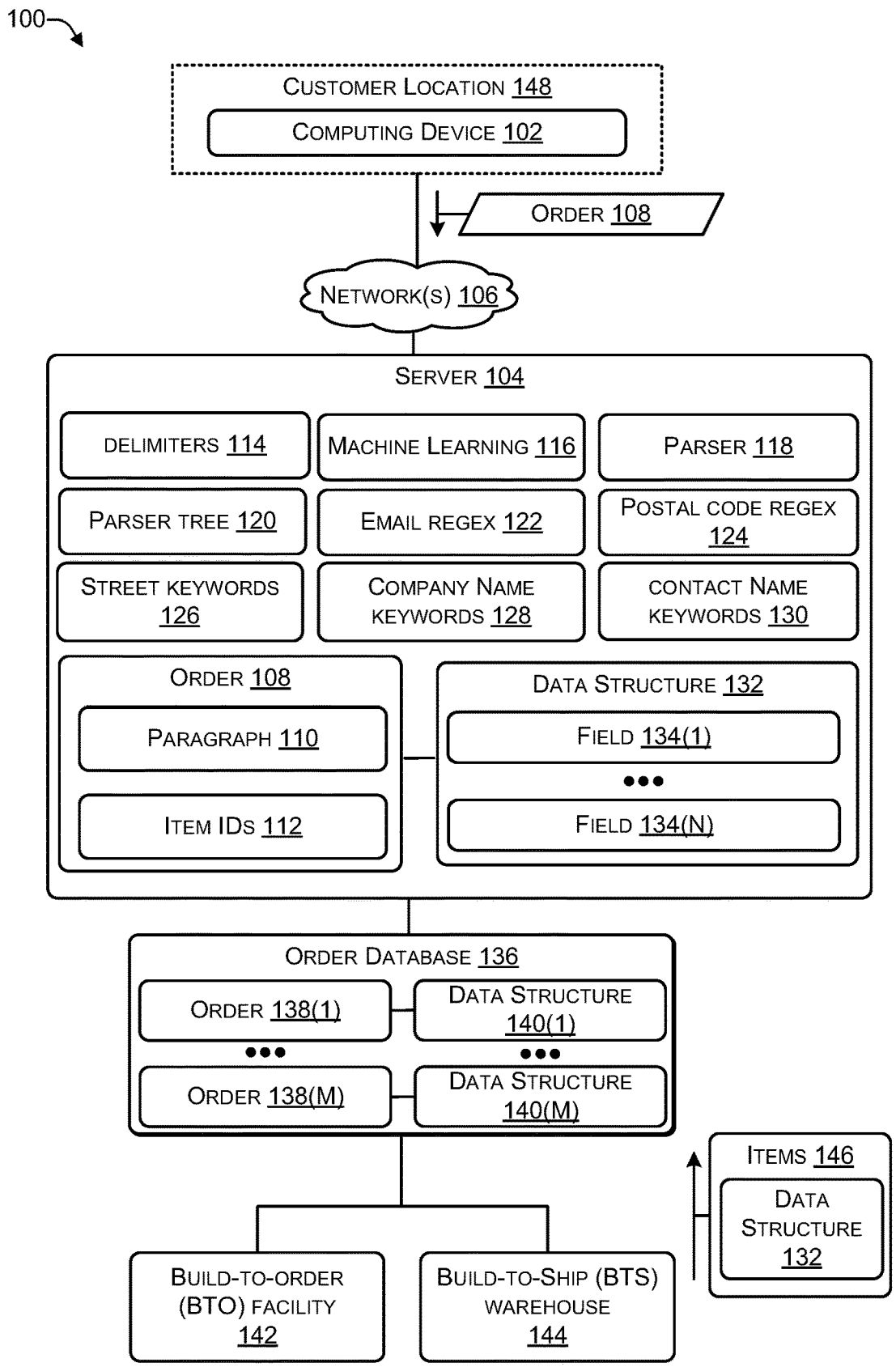
FIG. 1 is a block diagram of an illustrative system according to some embodiments.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein may enable a computing system (e.g., IHS) to identify address-related information from purchase orders having different formats and convert the address-related information into a consistent electronic data format for use by one or more systems (e.g., inventory system, accounting system, warehouse system, order fulfillment system, and the like). For example, the computing system may follow a pre-determined (e.g., sequential) order to identify and remove different types of address-related information, such as, for example, an email address, a state name, a zip code, a phone number, a contact name, a street name and number, a city name, additional address information (e.g., floor number, a department name or number, a post office box number, a room number, a suite number, or a mail stop number), a company name, a contact name, other address-related information, or any combination thereof. The computing system may use regular expressions, machine learning, and other techniques as described herein to identify particular types of the address-related data. The computer system may be able to achieve improved efficiency, such as reduced memory usage, faster processing of purchase orders, and other efficiencies by accurately identifying particular fields in address-related information and storing such information as structured data (e.g., a database), alphanumerical characters, tokens or the like (rather than for example as images), as compared with existing computing systems.

As a first example, a computing system may include one or more processors and one or more computer-readable storage media coupled to the one or more processors. A plurality of instructions may be stored on the one or more computer-readable storage media and executable by the one or more processors to perform operations. For example, the operations may include receiving a document including a paragraph associated with a purchase order. "Receiving a document" may include being given or presented with a document or, in some cases, capturing a document such as an image. The document may have a particular type of format, such as, for example a Portable Document Format (PDF), an image format, such as tagged image file format (TIFF), joint photographic experts (JPEG), or the like.

The document may be a physical document or an electronic document. For example, the physical document may include a paper address label. For another example, the electronic document may include one or more digital address labels, such as a radio-frequency identification (RFID) code, a bar code, or a Quick Response (QR™) code. The digital address labels may not include any human-readable information. The digital address labels may be received and read by a computing system and may be used to generate a data structure associated with the purchase order as described herein.

The document format may include address-related information in a portion of the document which is referred to herein as the paragraph. The paragraph may include unstructured data such as unlabeled data with multiple unlabeled (e.g., unidentified) fields. For this reason, the paragraph as received in the document may be unsuitable for a system that uses structured data such as labeled data (e.g., labeled as a contact name, company name, street address, state, postal code, email address, and the like). The systems and techniques described herein may convert the unstructured data such as unlabeled data into structured data such as labeled data suitable for use by one or more computer systems. The systems and techniques described herein may convert the paragraph into digital information that may contain text. The systems and techniques described herein may parse the text to generate a data structure associated with the purchase order. Generating a data structure may include creating a new data structure and populating the new data structure with data.

The paragraph may be converted into text, for example, using Optical Character Recognition (OCR) or other suitable method. OCR, as used herein, may refer to an electronic conversion of a document (e.g., a pdf or an image) into machine-encoded text from sources such as a scanned document, a photo of a document, text superimposed on an image, or the like.

Lexical analysis may be used to determine whether all required fields in a data structure have data or not. For example, systems and techniques presented herein may generate a data structure with a plurality of data fields. The plurality of data fields may be determined by lexical analysis or other suitable techniques to have data in each required field, as compared with an expected data structure with data in all of the required fields, and may then generate a signal to conclude the data processing. Alternatively, the plurality of data fields may be determined by lexical analysis or other suitable techniques to have no data in some required field, as compared with an expected data structure with data in all of the required fields, and may generate a signal to do a further analysis.

One or more regular expressions may be used to identify particular types of address-related data. As used herein, "regular expression" "regex," or "regexp" may refer to a sequence of characters that may define a search pattern. For example, a regular expression of "[+−]?(\d+(\.\d+)?|\.\d+)([eE][+−]?\d+)?" may match any numeral. The operations may identify, based on an email regular expression, an email address in the text. The operations may, after identifying the email address, remove the email address from the text and add the email address to an email field in a data structure. Similar operations may be performed for other fields in the paragraph. In this way, unlabeled data is identified in the paragraph, removed from the text, and labeled by placing it in a labeled field of a data structure. Removing the identified data from the text makes it easier to identify other data in the remaining text. The operations may identify, based on a postal regular expression, a postal code (e.g., U.S. zip code or other countries' post code). After identification, the operations may remove the postal code from the text and add the postal code to a postal code field in the data structure. The operations may search for digits in the text and identify a phone number from the digits in the text; after identification, the operations may remove the phone number from the text and add the phone number to a phone number field in the data structure. The operations may determine a street name and a street number in the text, remove the street name and street number from the text, and add the street name and street number to a first address field in the data structure. The operations may determine a city name, a contact name, and a company name in the text, remove the city name, contact name, and company name from the text, and store the city name, contact name, and company name in the data structure. Thus, the operations may extract multiple data items in turn (e.g., in a particular order) from the unlabeled paragraph and store each data item in a labeled data field of the data structure. The multiple data items that are stored in the labeled data fields may include an email address, a postal code, a phone number, a street name and a street number, a city name, a contact name, a company name, or the like.

The operations may parse the text to populate fields in a data structure and associate the data structure with the purchase order. Parsing, as used herein, may refer to a process to analyze a string of symbols (e.g., alphanumeric characters and special characters). For example, the operations may identify one or more delimiters in the text, break the text into words based on the one or more delimiters, and identify a particular portion of the address based on the one or more delimiters. A delimiter, as used herein, may refer to a sequence of one or more characters that may be used to specify a boundary between separate, and independent regions in the paragraph. The operations may, in some cases, use a parse tree to identify a pre-determined number of fields. A parse tree, as used herein, may refer to an ordered, rooted data structure that identifies a particular order in which fields are extracted from the paragraph.

The operations may identify, based on machine learning, a company name, a contact name, or both associated with the purchase order. In some cases, after the machine learning is used to identify a particular company name or a particular contact name, the machine learning may use a predetermined location map to identify and remove particular fields.

For example, the machine learning may, after training, recognize that for company XYZ, e.g., certain fields (e.g., the purchase order (PO) number, phone number, etc.) are placed in particular locations in the paragraph. After identifying that the company is XYZ, the machine learning may identify particular address-related fields (e.g., the PO number, phone number, etc.) based on this pattern associated with company XYZ.

As another example, the machine learning may identify a pattern associated with a particular contact name (the name associated with ATTN:<name> or the like, e.g., "ATTN: John Smith" or "ATTN: Jane Jones"). The pattern may include an arrangement of particular fields (e.g., the PO number, phone number, etc.) in the paragraph. For example, if John Smith at company XYZ places particular address-related information (e.g., the PO number, phone number, etc.) in particular locations, then the machine learning may, after identifying "ATTN: John Smith," use the pattern associated with John Smith and therefore know which particular locations in the paragraph are associated with which particular address-related information. Similarly, if Jane Jones at the same company (a different contact person at the same company XYZ) is identified as having created the purchase order, the machine learning may select a pattern associated with Jane Jones at company XYZ. The machine learning may use the pattern associated with "Jane Jones" to find particular fields of the address-related information in the paragraph. Thus, the operations may use machine learning to identify locations where different types of address-related information are located in a paragraph based on a particular company name, a particular contact name, or a combination of company name and contact name.

Machine learning can also be used to identify address-related information based on one or more pre-determined patterns related to formats. For example, machine learning can learn that a particular company or a particular contact person has a certain format for a particular field (e.g., "XYZ" company has a format of "12345 Lane" instead of "12345 Ln."). Machine learning can apply the known format to identify or validate address-related information as long as the pattern is validated and consistent. For example, machine learning can create a query to search for "12345 Lane" based on the known format.

Machine learning, as used herein, may refer to a process of using algorithms and statistical models to perform a specific task based on patterns and inference. Machine learning may involve the use of supervised learning, unsupervised learning, reinforcement learning, feature learning, sparse dictionary learning, anomaly detection, association rule learning, artificial neural network, decision tree learning, Bayesian networks, genetic algorithm, federated learning, random forests, support vector machine or the like.

The operations may use particular keywords to identify a city, a contact a company name and the like. Additionally or alternatively, the operations may use an email address regular expression to identify an email address in the text. The operations may determine that the paragraph has a first size, determine that the pre-determined number of fields have a second size, and determine that the second size is less than first size. In this way, extracting the fields from the paragraph may result in reducing the number of memory that is used. Thus, parsing the "ship to" paragraph of a purchase order may use multiple techniques, such as, for example, matching a regular expression, identifying delimiters, machine learning, predefined keywords, or any combination thereof to identify particular fields in the paragraph.

In a second example, a computer-implemented method may receive a document including a paragraph associated with a purchase order and to convert the paragraph into text. The computer-implemented method may include using a parser to identify a particular field in the text, remove the particular field from the text, store the particular field in a data structure associated with the purchase order, and repeating this process until a pre-determined number of fields have been identified, removed, and stored. A parser, as used herein, may refer to instructions that may take input data (e.g., text) and build a data structure to represent the input data following a set of predefined rules, such as any kind of grammar. The computer-implemented method may identify, based on a phone number regular expression, one or more delimiters, or both, a phone number in the text. The phone number may include an area code (e.g., three digits in North America), an exchange code (e.g., three digits in North America), and a number (four digits in North America). In some cases, the phone number (e.g., an office phone number) may include an extension having one or more digits. The computer-implemented method may parse the text by identifying, based on a pre-determined list of state names in full form (e.g., Texas) and abbreviated form (e.g., TX), a state name in the text. The computer-implemented method may parse the text by identifying, based on machine learning or a street name regular expression, a street name in the text.

The computer-implemented method may also include identifying words corresponding to the spelling of numbers (e.g., thirty-six), converting the words into digits (e.g., 36), and identifying a street number based on the digits. The computer-implemented method may include identifying, based on machine learning or a location regular expression, a floor number, a department name, a department number, a post office box number, a room number, a suite number, a mail stop number, another type of location identifier, or any combination thereof.

In a third example, one or more non-transitory computer-readable storage media to store instructions that are executable by the one or more processors to perform various operations. For example, the operations may include receiving a document that includes a paragraph associated with a purchase order and converting the paragraph into text. The operations may include parsing the text to identify particular portions that include a state name, a zip code, a city name, a street name and number, a phone number, an email address, a contact name, and a company name. The parsing may be performed using a pre-determined (e.g., sequential) order. The operations may include removing particular portions of address-related information from the text based on the pre-determined sequential order and storing the particular portions to fields in a data structure. The operations may follow a pre-determined sequential order to identify and remove an email address, a state name, a zip code, a phone number, a contact name, a street name and number, a city name, additional address information (e.g., floor number, a department name or number, a post office box number, a room number, a suite number, or a mail stop number), a company name, and a contact name. Alternatively, the operations may follow another pre-determined sequential order to identify and remove a contact name, a zip code, a state name, a city name, additional address information (e.g., a floor number, a department name or number, a post office box number, a room number, a suite number, or a mail stop number), a company name, a contact name, an email address, and a phone number. The order in which each particular portion of address-related information is described is not intended to be construed as a limitation, and any number of the described particular portions can be combined in any order and/or in parallel to implement the operations.

FIG. 1 is a block diagram of a system 100 to extract individual fields from a paragraph associated with a purchase order according to some embodiments. The system 100 may include a representative computer device 102 connected to a server 104 via one or more network(s) 106.

The computing device 102 may create and send an order 108 to the server 104 via the network(s) 106. The server 104 may receive the order 108 that includes a paragraph 110 (e.g., a "ship to" paragraph) and item identifiers (IDs) 112. The paragraph 110 may include information associated with the order 108, such as an address where the items corresponding to the item IDs 112 are to be shipped (a street name and a street number, a city name, a state name, a postal code, a floor number, a department name, a department number, a post office box number, a room number, a suite number, a mail stop number, another type of location identifier), a company name, a name of a contact person (e.g., the person who placed the order 108), an email address of the contact person, a phone number of the contact person, the like, or any combination thereof. The item IDs 112 may include names (e.g., XPS laptop) of the items that have been ordered, a manufacturer's identifier (e.g., serial number, service tag, or the like) of each of the items that have been ordered, stock keeping units (SKUs) of the items that have been ordered, other information related to the items that have been ordered, or any combination thereof.

The server 104 may include delimiters 114, a machine learning module 116, a parser module 118, a parse tree 120, email regular expression 122, postal code regular expression 124, street keywords 126, company name keywords 128, contact name keywords 130, and a data structure 132. The delimiters 114 may identify a user-defined list of delimiters, for example, any field and record delimiter or bracket delimiter, such as at least one new line, at least one space, at least one tab, at least one comma (","), at least one period ("."), at least one forward slash ("/"), at least one backslash ("/"), at least one hash ("#"), at least an asterisk ("*"),at least a parenthesis ("( )"), at least a bracket ("[ ]"), at least a quote, at least a question mark ("?"), at least another type of delimiter, or any combination thereof on the server 104. The server 104 may use a user-defined list of delimiters from the delimiters 114 and break the paragraph 110 into a plurality of words based on the delimiters. For example, the sever 104 may use delimiters such as a comma (",") and one or more spaces to identify "Austin," "TX," and "78664" in "Austin, Tex. 78664."

The machine learning module 116 may be trained to identify one or more fields in the paragraph 110, such as an address where the items corresponding to the item IDs 112 are to be shipped, a company name, a name of a contact person, an email of the contact person, a phone number of the contact person, other information, or any combination thereof. For example, the machine learning module 116 may be trained to identify, based on identifying a particular company name or a particular contact name, a particular arrangement of fields in the paragraph.

For example, the machine learning module 116 may, after training, recognize that for company XYZ, e.g., certain fields (e.g., the purchase order (PO) number, phone number, etc.) are placed in particular locations in the paragraph. After identifying that the company is XYZ, the machine learning module 116 may identify particular address-related fields (e.g., the PO number, phone number, etc.) based on this pattern associated with company XYZ.

As another example, the machine learning module 116 may identify a pattern associated with a particular contact name (the name associated with ATTN:<name> or the like, e.g., "ATTN: John Smith" or "ATTN: Jane Jones"). The pattern may identify an arrangement of particular fields (e.g., the PO number, phone number, etc.) in the paragraph. For example, if John Smith at company XYZ places particular address-related information (e.g., the PO number, phone number, etc.) in particular locations, then the machine learning may, after identifying "ATTN: John Smith," use the pattern associated with John Smith and therefore know which particular locations in the paragraph are associated with which particular address-related information. Similarly, if Jane Jones at the same company (a different contact person at the same company XYZ) is identified by the machine learning module 116 as having created the purchase order, the machine learning module 116 may select a pattern associated with Jane Jones at company XYZ. The machine learning module 116 may use the pattern associated with "Jane Jones" to find particular fields of the address-related information in the paragraph. Thus, the machine learning module 116 may use machine learning to identify locations where different types of address-related information are located in a paragraph based on a particular company name, a particular contact name, or a combination of company name and contact name.

The parser module 118 may extract (e.g., identify and remove) information from the paragraph 110 by using the parse tree 120 that specifies the order in which each field is extracted from the paragraph 110. For example, the parser module 118 may extract an email using an email regex (i.e., email regular expression) 122 extract a postal code using a postal code regex (i.e., postal code regular expression) 124, extract a street name and a street number based on street keywords 126, extract a company name based on company name keywords 128, extract a contact name based on contact name keywords 130, or any combination thereof.

The parser module 118 may, in some cases, parse information from the paragraph 11—using the parse tree 120. The parse tree 120 may specify a tree-like data structure that may include several nodes associated with address-related information. The address-related information may include, but not limited to, a name of a company associated with the order 108, the purchase order (or invoice) number, a name of a contact person (e.g., the person who placed the order 108), an email of the contact person, a phone number of the contact person, address information where the order 108 will be shipped to (e.g., street number and street name), additional address information (e.g., a suite number, floor number, department number, and the like).

The parser module 118 may use the email regular expression 122 to identify an email address in the paragraph 110. For example, the email regular expression may match a format of <user name>@<company name>.<domain name>. For example, in "john_smith@xyz_corp.com," "john_smith" is the user name, "xyz_corp" is the company name and "com" is the domain name. The parser module 118 may further remove the email address from the paragraph 110 and add the email address to a labeled email field in the data structure 132.

The parser module 118 may use the postal code regular expression 124 to identify a postal code in the paragraph 110. For example, the postal code regular expression may be a U.S. zip code regular expression that may match any format including <NNNNN>, <NNNNN-NNNN>, or <NNNNNNNNN>, or a combination thereof. N may be a number between 0 and 9. For example, the U.S. zip code regular expression may match a zip code (e.g., "78664," "78664-1234," or "786641234"). The parser module 118 may remove the post code from the paragraph 110 and add the postal code to a labeled postal code field in the data structure 132.

The parser module 118 may access street keywords 126 and use the street keywords 126 to identify a street name and a street number (e.g., "1234 Main Street," where "1234" is the street number and "Main Street" is the street name) in the paragraph 110. The street keywords may include abbreviations, such as "St.", "Ave.", "Rd.", or the corresponding keyword spelled out such as "Street," "Avenue," "Road," and the like. The parser module 118 may remove the street name and number from the paragraph 110 and add the street name and number to a labeled address field in the data structure 132.

The parser module 118 may use the company name keywords 128 (e.g., by searching for "company," "Co.," "LLC," "Ltd.," the like, or any combination thereof) to identify a company name (e.g., "123 Company") in the paragraph 110. The parser module 118 may remove the company name (e.g., "123 Company") from the paragraph 110 and add the company name to a company name field in the data structure 132.

The parser module 118 may use the contact name keywords 130 (e.g., by searching for "contact," "contact person," "care of," "C/O," "ATTN," "ATN," the like, any misspellings of such words, or any combination thereof) to identify a contact name (e.g., "c/o John Smith") in the paragraph 110. The parser module 118 may remove the contact name (e.g., "c/o John Smith") from the paragraph 110 and add the contact name to a contact name field in the data structure 132.

The parser module 118 may store the extracted information as individual fields 134(1) to 134(N) (N>0) in a data structure 132. The fields 134(1) to 134(N) may include information extracted from the paragraph 110, such as the company name, the purchase order (or invoice) number, a name of a contact person (e.g., the person associated with the order 108, such as "John Smith"), an email of the contact person (e.g., "john_smith_@xyz_corp.com"), a phone number of the contact person (e.g., "503-123-4567"), address information (e.g., street number and street name, such as "1234 Main Street"), additional address information (e.g., a suite number, floor number, department number, and the like, such as "Suite 100").

After the parser module 118 extracts and stores the fields 134(1)-134(N) in the data structure 132, the server 104 may store the order 108 and the corresponding data structure 132 in an order database 136. The order database 136 may also include previously received orders 138(1) to 138(M) (M>0). Each of the previously received orders 138(1) to 138(M) may have a corresponding data structure 140(1) to 140(M) that stores the labeled fields extracted from the corresponding one of the orders 138(1) to 138(M). For example, the labeled fields may include a street name and a street number, a city name, a state name, a postal code, a floor number, a department name, a department number, a post office box number, a room number, a suite number, a mail stop number, another type of location identifier, a company name, a name of a contact person (e.g., the person who placed the corresponding previously received order), an email address of the contact person, a phone number of the contact person, the like, or any combination thereof.

The order database 136 may send the order 108 and the corresponding data structure 132 to a build-to-order (BTO) facility 142, a build-to-ship (BTS) warehouse 144, or both for order fulfillment. Items 146 corresponding to the item IDs 112 may be shipped to a customer location 148 identified in the data structure 132 from the BTO facility 142, the BTS warehouse 144, or both. A build-to-order (BTO) facility, as used herein, may refer to a facility where products may not be built until a confirmed order for products is received. The order may be customized for each individual customer. For example, a BTO website may enable a user to place an order for a computing device by specifying a size of a display device, a processor, a clock speed of the processor, an amount of random-access memory, an amount storage, and the like. A build-to-ship (BTS) facility, as used herein, may refer to a facility where products may be built before a confirmed order for products is received and may be suitable for mass production. For example, a computing device manufacturer may manufacturer thousands of computing devices based on several pre-determined configurations and store the computing devices in a warehouse for distribution to retailers (e.g., Walmart®, Best Buy®, and the like).

Thus, a computing system such as a server 104 may include software modules that enables a user to process a plurality of purchase orders with address-related information in different formats simultaneously with improved efficiency and accuracy and generate purchase orders based on the address-related information in a consistent format.

The computing system may be able to use machine learning and regular expression to identify address-related information in a purchase order. For example, the computing system may use email regular expression (e.g. an email regular expression that may match a format of <user name>@<company name>.<domain name>), post code regular expression (e.g., a U.S. zip code regular expression that may match any format including <NNNNN>, <NNNNN-NNNN>, or <NNNNNNNNN>, or a combination thereof), or any other suitable regular expression. For another example, the computing system may use street keywords (e.g., "ST," "Street," "Ave," "Avenue," the like, or any combination thereof), company name keywords (e.g., search for "company," "Co.," "LLC," "Std," the like, or any combination thereof), contact name keywords (e.g., search for "contact," "contact person," "care of," "C/O," "ATTN," "ATN," the like, any misspelling, or any combination thereof)), or any other suitable keywords. After identification, the address-related information may be removed from the text and used to generate purchase orders in a consistent format.

Figure 2:
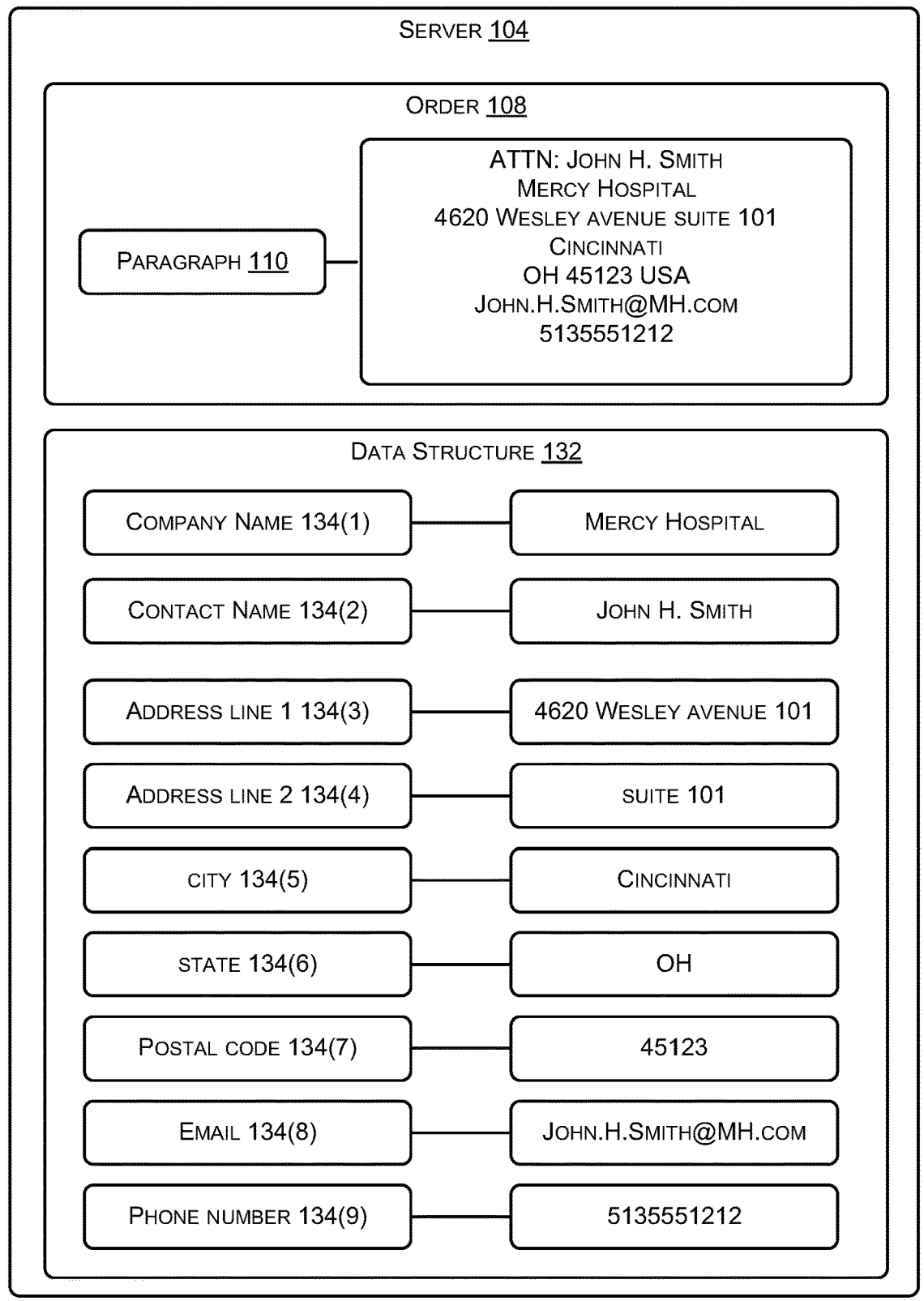
FIG. 2 is a block diagram illustrating an exemplary user-accessible interface including a display of individual fields and a paragraph associated with a purchase order according to some embodiments.

FIG. 2 is a block diagram illustrating an exemplary user-accessible interface including a display of individual fields and a paragraph associated with a purchase order according to some embodiments. FIG. 2 provides an example of the paragraph 110 (e.g., "Paragraph") in FIG. 1. The server 104 in FIG. 1 may extract individual fields 134(1)-134(N) from the paragraph 110. For example, the fields 134(1)-134(N) may include "Company Name," "Contact Name," "Address Line1," "Address Line2," "City," "State," "Postal Code," "Email," and "Phone Number" as illustrated in FIG. 2.

For example, "John.H.Smith@MH.com" may be identified in the paragraph 110 by using a regex of "<user name>@<company name>.<domain name>" and may be removed from the paragraph 110 and stored as a labeled field 134(8) in the data structure 132. For example, in "John.H.Smith@MH.com," "John.H.Smith" is the user name, "MH" is the company name and "com" is the domain name.

After removing "John.H.Smith@MS.com" from the paragraph 110, "OH" may be identified by using a keyword list including all fifty U.S. state names in full form (e.g., Ohio) and the corresponding abbreviated from (e.g., OH) and may then be removed from the paragraph 110 and stored as a labeled field 134(6) in the data structure 132.

After removing "OH" from the paragraph 110, "45212" may be identified by using a postal code regular expression (e.g., a U.S. zip code regular expression matching a format of <NNNNN>, <NNNNN-NNNN>, or <NNNNNNNNN>, or a combination thereof. N may be a number between 0 and 9) and then be removed from the paragraph 110 and stored as a labeled field 134(7) in the data structure 132. In this case, because "OH" has been identified and labeled as a state name, the postal code regular expression may be selected to match available postal codes in Ohio.

After removing the "45123" from the paragraph 110, a contact's phone number "5133551212" may be identified by using a phone number regular expression (e.g., a U.S. phone number regular expression matching a format of <XXX-XXX-XXX-XXXX>, <(XXX)XXX-XXX-XXXX>, <XXX-XXX-XXXX>, <XXX-XXXXXXX>, <XXXXXXXXXX>, <XXXXXXXXXX-XXXX>, or <XXXXXXXXXX-XXXXX>, any known area codes of a country (e.g., "001" for U.S) or a state (e.g., all known Ohio area codes), or a combination thereof. X may be a number between 0 and 9) and then be removed from the paragraph 110 and stored as a labeled field 134(9) in the data structure 132.

After removing the contact's phone number "5133551212" from the paragraph 110, a search of information associated with a list of contact name keywords such as "ATTN: <name>," "ATN," "C/O," and other such keywords, or any misspelling thereof may be performed to identify a contact name. If the search identifies a contact name "John. H. Smith" from the paragraph 110, the contact name "John H. Smith" may be removed from the paragraph 110 and stored as a labeled field 134(2) in the data structure 132. If the search fails to identify any meaningful information based on the keywords, address information "4620 WESLEY AVENUE" may be searched for and identified based on a list of street name keywords (e.g., AVENUE, BLVD, AVE, Street, ST, Court, Conn., etc.) and may be removed from the paragraph 110 and stored as a labeled field 134(3) in the data structure 132.

After removing the address information from the paragraph 110, the city name "CINCINNATI" may be identified based on a list of city name keywords (e.g., Cincinnati and all the other known city names of Ohio or any misspellings thereof) and may then be removed from the paragraph 110 and stored as a labeled field 134(5) in the data structure 132.

After removing the city name "CINCINNATI" from the paragraph 110, additional address information such as "SUITE 101" may be searched for and identified based on a list of keywords such as "Suite," "Floor," "STE," "FL," "Mail Stop," or any misspelling, variation or combination thereof. "SUITE 101" may then be removed from the paragraph 110 and stored as a labeled field 134(4) in the data structure 132.

After removing "SUITE 101" from the paragraph 101, a company name "MERCY HOSPITAL" may be identified based on a list of company name keywords (e.g. SSO, LTD, LLC, etc.) or machine learning based on a particular pattern (e.g., certain address fields are associated with a particular company name). The company name "MERCY HOSPITAL" may then be removed from the paragraph 110 and stored as a labeled field 134(1) in the data structure 132. After removing the company name "MERCY HOSPITAL" from the paragraph 101, the remaining information in the paragraph 110 may be analyzed for contact names using machine learning based on a particular pattern (e.g., a particular contact may be always associated with a particular address and phone number) if the previous search for contact name based on a list of keywords (e.g., search for "contact," "contact person," "care of," "C/O," "ATTN," "ATN," the like, any misspelling, or any combination thereof) fails. The contact name "John H. Smith" may be identified and stored as a labeled field 134(2) in the data structure 132.

Thus, by using a combination of regular expression and machine learning and other suitable techniques and successive removal of information to facilitate data processing, the systems and techniques presented herein may allow efficient conversion of unlabeled data into labeled data.

Figure 3:
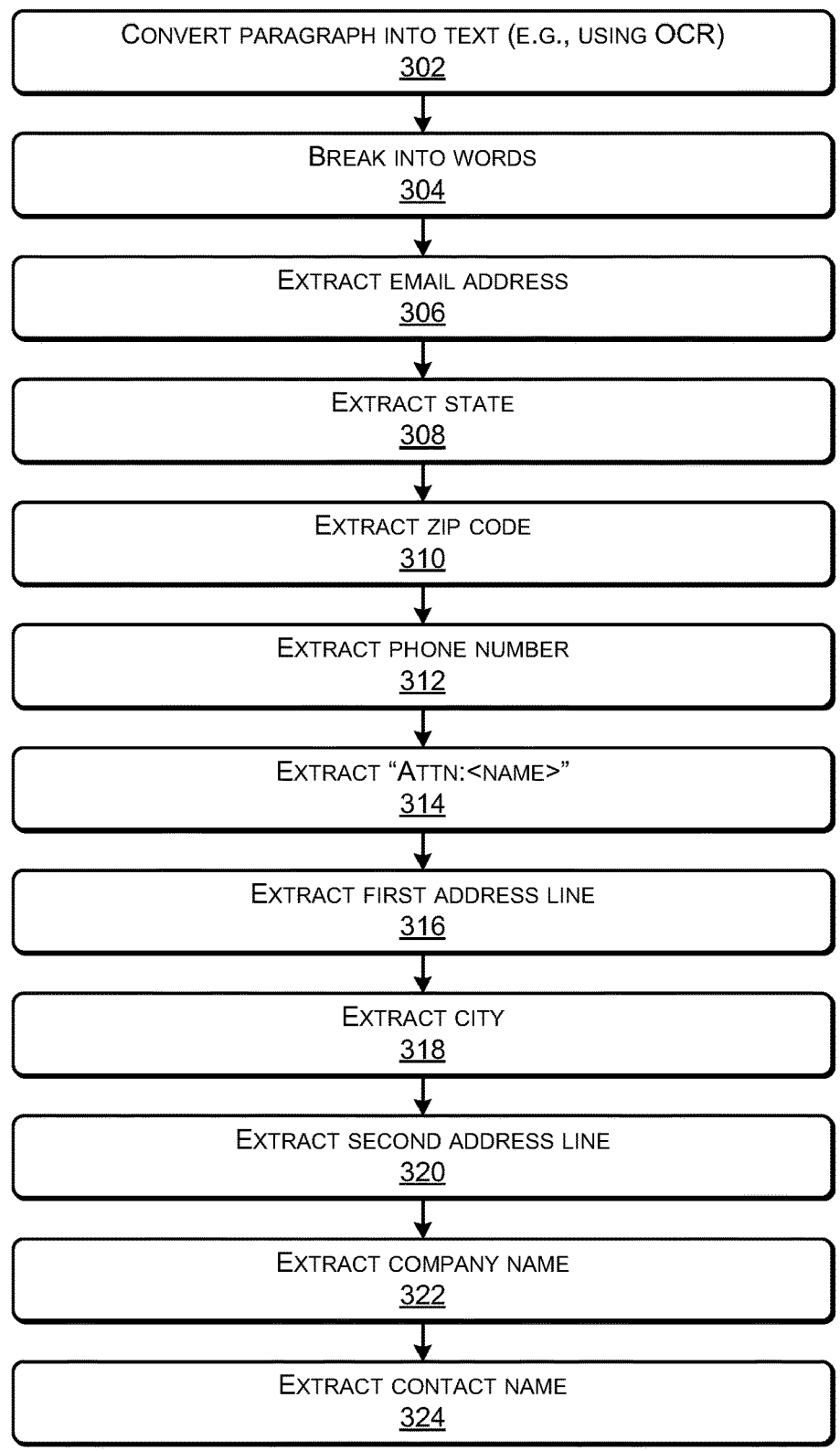
FIG. 3 is a flow chart of an example process to convert unlabeled data into labeled data associated with a purchase order according to some embodiments.
Figure 4:
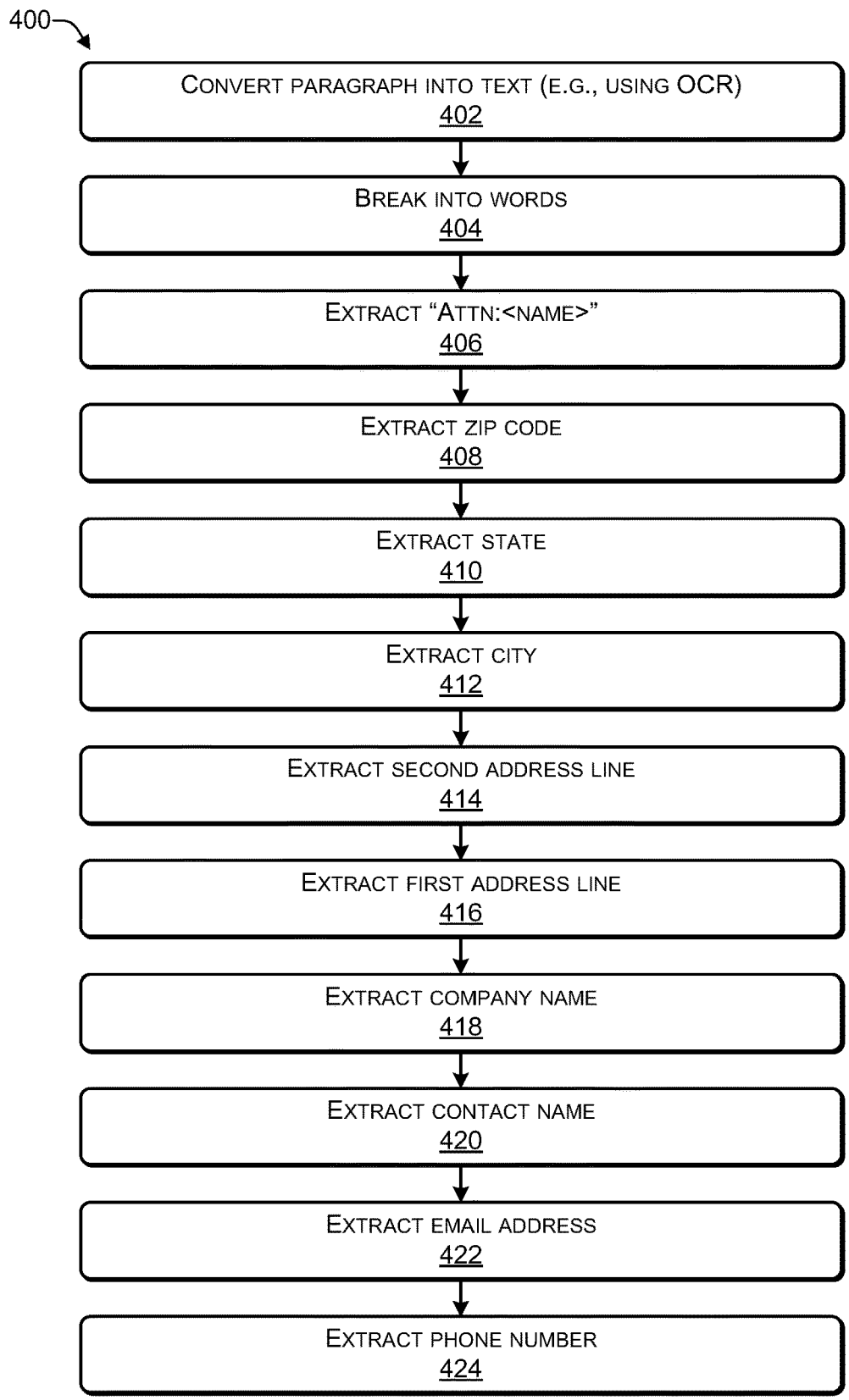
FIG. 4 is a flow chart of an example process to convert unlabeled data into labeled data associated with a purchase order according to some other embodiments.
Figure 5:
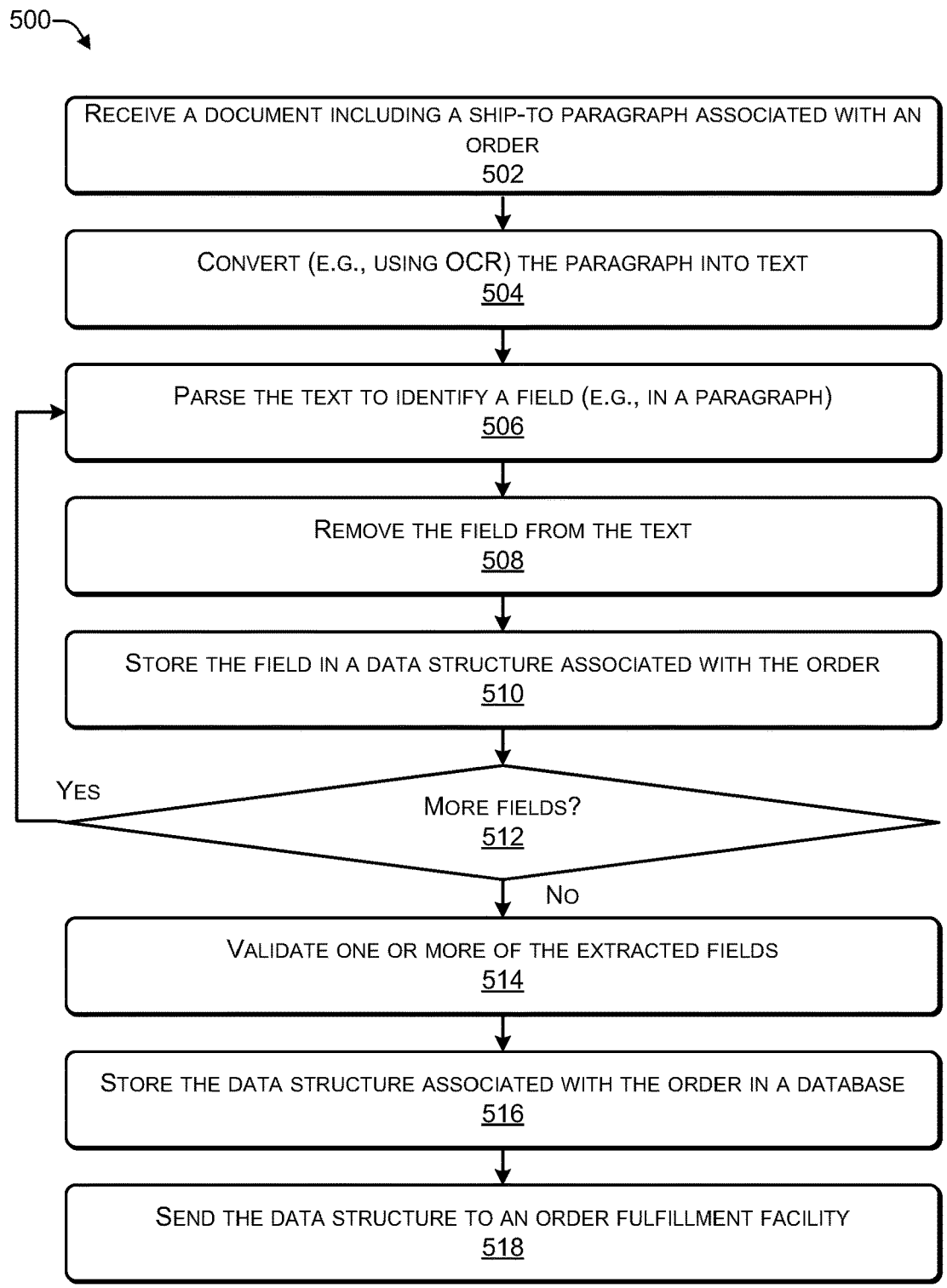
FIG. 5 is a flow chart of an example process to convert unlabeled data into labeled data associated with a purchase order and store the labeled data in a data structure according to some embodiments.

In the flow diagrams of FIGS. 3-5, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 300, 400, and 500 are described with reference to FIGS. 1-2, as described above, although other models, frameworks, systems and environments may be used to implement the processes.

FIG. 3 is a flow chart of a first process 300 to convert unlabeled data into labeled data associated with an order according to some embodiments. The process 300 may convert a paragraph that includes address-related data to the fields 134(1) to 134(N) of FIG. 1. The process 300 may be performed by, for example, the server 104 of FIG. 1.

At 302, the paragraph may be converted into text (e.g., using optical character recognition (OCR) or another technique). At 304, the process 300 may break the text into multiple words. For example, the process 300 may use a list of delimiters to break the text into multiple words. Delimiters may include at least one new line, at least one space, at least one tab, at least one comma (","), at least one period ("."), at least one forward slash ("/"), at least one backslash ("/"), at least one hash ("#"), at least an asterisk ("*"), at least a parenthesis ("( )"), at least a bracket ("[ ]"), at least a quote, at least a question mark ("?"), at least another type of delimiter, or any combination thereof.

The process 300 may use regular expressions (regex) or other methods to identify data related to various fields based on the words. At 306, the process 300 may extract an email address. For example, the process 300 may use a regular expression (regex), such as an email regular expression that may match a format of <user name>@<company name>.<domain name>, to identify a corporate email address. For example, in "john_smith@xyz_corp.com," "john_smith" is the user name, "xyz_corp" is the company name and "com" is the domain name. Non-limiting examples of domain names include "com," "gov," "net," "edu," "org," or "info." After the identification, the process 300 may remove the email address from the text and add the email address to a labeled email address field in the data structure 132 in FIG. 1.

At 308, the process 300 may extract a state name. For example, the process 300 may use two character abbreviations of state names (e.g. "TX"), full state names, such as "Alabama," "California," "Texas," or any misspelling of full state names to identify a state name. After the identification, the process 300 may remove the state name from the text and add the state name to a labeled state name field in the data structure 132 in FIG. 1.

At 310, the process 300 may extract a postal code, such as a U.S. zip code. For example, the process 300 may use a postal code regular expression to identify any five-digit number, nine-digit number, or five-digit number connected with a four-digit number with a dash as a zip code. The postal code regular expression may be a U.S. zip code regular expression that may match any format including <NNNNN>, <NNNNN-NNNN>, or <NNNNNNNNN>, or a combination thereof. N may be a number between 0 and 9. The process 300 may use any suitable regular expression to identify any five-digit and nine-digit format of zip codes. For example, the regular expression may be "^[0-9]{5}(?:-[0-9]{4})?$." The exemplary regular expression may be used to search for zip codes of five digits or nine digits with a "-" combining five and four digits. The process 300 may also identify non-U.S. postal codes by using a regular expression that matches non-U.S. postal code formats, such as a Canadian postal code, an Indian postal code, or a Chinese postal code. After the identification, the process 300 may remove the postal code from the text and add the postal code to a labeled postal code field in the data structure 132 in FIG. 1.

Additionally or alternatively, at 308 and 310, the process 300 may extract a state name and a postal code such as a zip code together. For example, the process 300 may determine, based on a postal code regular expression, a state name and a postal code. For example, the postal code regular expression may match a format of <XX?NNNNN>, <XX?NNNNN-NNNN>, <XX?NNNNNNNNN>, or a combination thereof. N may be a number between 0 and 9. XX may be any two-letter abbreviation of U.S. state names. For example, the process 300 may be able to use the postal code regular expression to identify "TX 78664." After the identification, the process 300 may remove the state name and postal code "TX 78664" from the text and add the state name and postal code to a respective labeled field in the data structure 132 in FIG. 1.

At 312, the process 300 may extract one or more phone numbers. The process 300 may use any known U.S. area codes and delimiters to identify phone numbers associated with the order 108. The delimiters may include one or more of "(," ")," "<," ">," "-," " — ," or a combination thereof. Additionally or alternatively, the process 300 may also use a regular expression (e.g., a U.S. phone number regular expression matching a format of <XXX-XXX-XXX-XXXX>, <(XXX)XXX-XXX-XXXX>, <XXX-XXX-XXXX>, <XXX-XXXXXXX>, <XXXXXXXXXX>, <XXXXXXXXXX-XXXX>, or <XXXXXXXXXX-XXXXX>) to identify any phone numbers without an extension or with an extension of three, four or five digits. After the identification, the process 300 may remove the phone number from the text and add the phone number to a phone number field in the data structure 132 in FIG. 1.

At 314, the process 300 may extract information associated with an "ATTN: <name>," "ATN," or "C/O," or any misspelling or combination thereof that can be used to indicate the name of a contact person who placed the order 108. After the identification, the process 300 may remove the contact name from the text and add the contact name to a labeled contact name field in the data structure 132 in FIG. 1.

At 316, the process 300 may extract a first address line (i.e., primary address information), which may include a street number and a street name. The process 300 may identify a street name and a street number (e.g., "1234 Main Street") by searching for one or more of street name keywords as exemplified below (a list of words are separated by |):

TE|STCT|DR|SPGS|PARK|GRV|CRK|XING|BR|PINE|CTS|TRL|V

I|RD|PIKE|MA|LO|TER|UN|CIR|WALK|CO|RUN|FRD|LDG|ML|A

VE|NO|PA|SQ|BLVD|VLGS|VLY|GR|LN|HOUSE|VLG|OL|STA|CH

|ROW|EXT|JC|BLDG|FLD|CT|HTS|MOTEL|PKWY|COOP|ACRES|E

STS|SCH|HL|CORD|ST|CLB|FLDS|PT|STPL|MDWS|APTS|ME|LO

OP|SMT|RDG|UNIV|PLZ|MDW|EXPY|WALL|TR|FLS|HBR|TRFY|B

CH|CRST|CI|PKY|OV|RNCH|CV|DIV|WA|S|WAY|I|CTR|VIS|PL

|ANX|BL|ST TER|DM|STHY|RR|MNR.

After the identification, the process 300 may remove the street name and street number from the text and add the street name and street number to a labeled first address line field in the data structure 132 in FIG. 1.

At 318, the process 300 may extract a city name. The process 300 may search for a city name where a state name or a postal code was identified. Alternatively or additionally, the process 300 may perform the search using a keyword list based on one or more of city names (e.g., Cincinnati) of the state previously identified (e.g., Ohio). After the identification, the process 300 may remove the city name from the text and add the city name to a labeled city name field in the data structure 132 in FIG. 1.

At 320, the process 300 may extract information associated with a second address line, such as a suite number, a department number, a floor number, a mail stop number, or the like. For example, the process 300 may perform a search based on keywords such as "Suite," "Floor," "STE," "FL," "Mail Stop," or any misspelling, variation or combination thereof. After the identification, the process 300 may remove the second address line information (e.g., "Suite 100") from the text and add the second stress line information to a labeled second address line field in the data structure 132 in FIG. 1.

At 322, the process 300 may extract a company name. The process 300 may identify a company name by searching for one or more of company name keywords as exemplified below (a list of words are separated by |):

LTD|LLC|INC|SYSTEM|SCHOOL|CORP|COMMUNICATION|COMPAN
Y|SUPPLY|INSURANCE|FINANCE|UNIVERSITY|UNIV|NATIONAL
|BANK|DEPARTMENT|HEALTH|ADMINISTRATION|FIRM|DEVELOP
MENT|TECHNOLOGY|SERVICES|ENGINEERING|PRODUCTS|AGENC
Y|SOLUTIONS|SYSTEMS|INCORPORATED|INTERNATIONAL|MANA
GEMENT|SOFTWARE|WORKS|COMPANIES|GROUP|ACADEMY|TECHN
OLOGIES|COLLEGE|CITY|OFFICE|DEPT|CENTER|INTL|HOSPIT
AL|PROSECUTOR|HOSP|FARM|AGENCY|SOLUTIONS|COUNCIL|CO
UNTY|HEALTHCARE|MEDICAL|MARKETS|STUDIO|DATA|STARBUC
KS|PLANT|AUTOMOTIVE|CONNECTIONS|LOGISTICS|DISTRIBUT
ORS|CENTRAL|RECEIVING|COLLABORATORY|DIVISION|SERVIC
E|LLP|TECH|CONSTRUCTION|ELECTRIC|LABS|UNION|WHOLESA
LE|LIMITED|ENERGY|COMMUNITY|LABORATORIES|COURIER|AS
SOCIATES.

The process 300 may perform the search based on one or more of the company name keywords. The process 300 may also check a previously stored customer list for validation of company names. After the identification, the process 300 may remove the company name (e.g., "XYZ Company") from the text and add the company name to a labeled company name field in the data structure 132 in FIG. 1.

At 324, the process 300 may identify a contact name from any remaining data in the paragraph 110, particularly when a previous search for a contact name based on indicators such as an "ATTN: <name>," "ATN," or "C/O," or any misspelling or combination thereof failed. After the identification, the process 300 may remove the contact name (e.g. "ATTN: John Smith") from the text and add the contact name to a labeled contact name field in the data structure 132 in FIG. 1.

Thus, the process 300 may follow a pre-determined sequential order as described herein to extract address-related information and be able to extract information from the paragraphs in different formats associated with different purchase orders and generate orders with individual labeled fields representing the information in a consistent format with high efficiency and accuracy.

FIG. 4 is a flow chart of a second process 400 to convert unlabeled data into labeled data associated with an order according to some embodiments. The process 400 may convert a paragraph that includes address-related data to the fields 134(1) to 134(N) of FIG. 1. The process 400 may be performed by, for example, the server 104 of FIG. 1.

At 402, the paragraph may be converted into text (e.g., using optical character recognition (OCR) or another technique). The process 400 may break the text into multiple words, at 404. For example, the process 400 may use a list of delimiters to break the text into multiple words. Delimiters may include at least one new line, at least one space, at least one tab, at least one comma (","), at least one period ("."), at least one forward slash ("/"), at least one backslash ("/"), at least one hash ("#"), at least an asterisk ("*"),at least a parenthesis ("( )"), at least a bracket ("[ ]"), at least a quote, at least a question mark ("?"), at least another type of delimiter, or any combination thereof.

The process 400 may use regular expressions (regex) or other methods to identify data related to various fields based on the words. At 406, the process 400 may extract information associated with an "ATTN: <name>," "ATN," or "C/O," or any misspelling or combination thereof that can be used to indicate the name of a contact person (e.g., "ATTN: John Smith") who placed the order 108. After the identification, the process 400 may remove the contact name from the text and add the contact name to a labeled contact name field in the data structure 132 in FIG. 1.

At 408, the process 400 may extract a postal code, such as a U.S. zip code. For example, the process 400 may use a postal code regular expression to identify any five-digit number, nine-digit number, or five-digit number connected with a four-digit number with a dash as a zip code. The postal code regular expression may be a U.S. zip code regular expression that may match any format including <NNNNN>, <NNNNN-NNNN>, or <NNNNNNNNN>, or a combination thereof. N may be a number between 0 and 9. The process 400 may also use any other regular expression to identify any five-digit and nine-digit format of zip codes. For example, the regular expression may be "^[0-9]{5}(?:-[0-9]{4})?$." The exemplary regular expression may be used to search for zip codes of five digits or nine digits with a "-" combining five and four digits. The process 400 may also identify non-U.S. postal codes by using a regular expression that matches non-U.S. postal code formats, such as a Canadian postal code, an Indian postal code, or a Chinese postal code. After the identification, the process 400 may remove the postal code from the text and add the postal code to a labeled postal code field in the data structure 132 in FIG. 1. The process 400 may further assign a high probability associated with a pattern that a state name and a city name may be found around where the postal code was found and may use machine learning to look for a state name and a city name based on this pattern.

At 410, the process 400 may extract a state name. For example, the process 400 may use two character abbreviations of state names ("TX" or "CA"), full state names (e.g., "Alabama," "California," or "Texas,") or any misspelling of full state names to identify a state name. After the identification, the process 400 may remove the state name from the text and add the state name to a labeled state name field in the data structure 132 in FIG. 1.

Additionally or alternatively, at 408 and 410, the process 400 may extract a state name and a postal code such as a zip code together. For example, the process 400 may determine, based on a postal code regular expression, a state name and a postal code. For example, the postal code regular expression may match a format of <XX?NNNNN>, <XX?NNNNN-NNNN>, <XX?NNNNNNNNN>, or any combination thereof. N may be a number between 0 and 9. XX may be any two-letter abbreviation of U.S. state names. For example, the process 300 may be able to use the postal code regular expression to identify "TX 78664." After the identification, the process 400 may remove the state name and postal code from the text and add the state name and postal code to a respective labeled field in the data structure 132 in FIG. 1.

At 412, the process 400 may extract a city name. The process 400 may search for a city name where a state name or a postal code was identified (e.g., all of known city names of Texas if Texas was identified). After the identification, the process 400 may remove the city name from the text and add the city name to a city name field in the data structure 132 in FIG. 1.

At 414, the process 400 may extract information associated with a second address line, such as a suite number, a department number, a floor number, a mail stop number, or the like. For example, the process 400 may perform a search using a regular expression based on keywords such as "Suite," "Floor," "STE," "FL," "Mail Stop," or any misspelling, variation or combination thereof. After the identification, the process 400 may remove the second address line information from the text and add the second stress line information to a labeled second address line field in the data structure 132 in FIG. 1.

At 416, the process 400 may extract a first address line (i.e., primary address information), which may include a street number and a street name. The process 400 may further assign a high probability associated with a pattern that the first address line information such as a street name and a street number will be found around where the city was found, particularly before where the city was found, and may use machine learning to look for a state name and a city name based on this pattern. Additionally or alternatively, the process 400 may identify the first address line based on a pattern that includes a street or house number, E/W/N/S (east or west or north or south) followed by a street name. Additionally or alternatively, the process 400 may identify a street name and a street number by searching for one or more of street name keywords as exemplified below (a list of words are separated by |):

TE|STCT|DR|SPGS|PARK|GRV|CRK|XING|BR|PINE|CTS|TRL|V
I|RD|PIKE|MA|LO|TER|UN|CIR|WALK|CO|RUN|FRD|LDG|ML|A
VE|NO|PA|SQ|BLVD|VLGS|VLY|GR|LN|HOUSE|VLG|OL|STA|CH
|ROW|EXT|JC|BLDG|FLD|CT|HTS|MOTEL|PKWY|COOP|ACRES|E
STS|SCH|HL|CORD|ST|CLB|FLDS|PT|STPL|MDWS|APTS|ME|LO
OP|SMT|RDG|UNIV|PLZ|MDW|EXPY|WALL|TR|FLS|HBR|TRFY|B
CH|CRST|CI|PKY|OV|RNCH|CV|DIV|WA|S|WAY|I|CTR|VIS|PL
|ANX|BL|ST TER|DM|STHY|RR|MNR.

After the identification, the process 400 may remove the street name and street number from the text and add the street name and street number to a first address line field in the data structure 132 in FIG. 1.

At 418, the process 400 may extract a company name. The process 400 may identify a company name based on a company name keyword list. The contact name hint list may be generated from searches of a plurality of paragraphs based on processes described herein. For example, the process 400 may identify a company name by searching for one or more of company name keywords as exemplified below (a list of words are separated by |):

LTD|LLC|INC|SYSTEM|SCHOOL|CORP|COMMUNICATION|COMPAN
Y|SUPPLY|INSURANCE|FINANCE|UNIVERSITY|UNIV|NATIONAL
|BANK|DEPARTMENT|HEALTH|ADMINISTRATION|FIRM|DEVELOP
MENT|TECHNOLOGY|SERVICES|ENGINEERING|PRODUCTS|AGENC
Y|SOLUTIONS|SYSTEMS|INCORPORATED|INTERNATIONAL|MANA
GEMENT|SOFTWARE|WORKS|COMPANIES|GROUP|ACADEMY|TECHN
OLOGIES|COLLEGE|CITY|OFFICE|DEPT|CENTER|INTL|HOSPIT
AL|PROSECUTOR|HOSP|FARM|AGENCY|SOLUTIONS|COUNCIL|CO
UNTY|HEALTHCARE|MEDICAL|MARKETS|STUDIO|DATA|STARBUC
KS|PLANT|AUTOMOTIVE|CONNECTIONS|LOGISTICS|DISTRIBUT
ORS|CENTRAL|RECEIVING|COLLABORATORY|DIVISION|SERVIC
E|LLP|TECH|CONSTRUCTION|ELECTRIC|LABS|UNION|WHOLESA
LE|LIMITED|ENERGY|COMMUNITY|LABORATORIES|COURIER|AS
SOCIATES.

The process 400 may also check a previously stored customer list for validation of company names. After the identification, the process 400 may remove the company name from the text and add the company name to a company name field in the data structure 132 in FIG. 1.

At 420, the process 400 may identify a contact name based on a contact name keyword list, particularly when a previous search for a contact name based on indicators such as an "ATTN: <name>," "ATN," or "C/O," or any misspelling or combination thereof failed. The contact name hint list (e.g., common last names and first names, "Mr., "Ms.," "Jr.," "Dr.," or the like) may be generated from searches of a plurality of paragraphs based on processes described herein. After the identification, the process 400 may remove the contact name from the text and add the contact name to a labeled contact name field in the data structure 132 in FIG. 1.

At 422, the process 400 may extract an email address. For example, the process 400 may use a regular expression (regex), such as <user name>@<company name>.<domain name>, to identify a corporate email address. For example, in "john_smith@xyz_corp.com," "john_smith" is the user name, "xyz_corp" is the company name and "com" is the domain name. Non-limiting examples of domain names include "com," "gov," "net," "edu," "org," or "info." After the identification, the process 400 may remove the email address from the text and add the email address to a labeled email address field in the data structure 132 in FIG. 1.

At 424, the process 400 may extract one or more phone numbers. The process 400 may use any known U.S. area codes and delimiters to identify phone numbers associated with the order 108. Delimiters may include at least one new line, at least one space, at least one tab, at least one comma (","), at least one period ("."), at least one forward slash ("/"), at least one backslash ("/"), at least one hash ("#"), at least an asterisk ("*"), at least a parenthesis ("( )"), at least a bracket ("[ ]"), at least a quote, at least a question mark ("?"), at least another type of delimiter, or any combination thereof.

Additionally or alternatively, the process 300 may also use a regular expression (e.g., a U.S. phone number regular expression matching a format of <XXX-XXX-XXX-XXXX>, <(XXX)XXX-XXX-XXXX>, <XXX-XXX-XXXX>, <XXX-XXXXXXX>, <XXXXXXXXXX>, <XXXXXXXXXX-XXXX>, or <XXXXXXXXXX-XXXXX>) to identify any phone numbers without an extension or with an extension of three, four or five digits. After the identification, the process 400 may remove the phone number from the text and add the phone number to a labeled phone number field in the data structure 132 in FIG. 1.

Thus, the process 400 may follow another pre-determined sequential order as described herein to extract address-related information and be able to extract information from the paragraphs in different formats associated with different purchase orders and generate orders with individual labeled fields representing the information in a consistent format with high efficiency and accuracy.

FIG. 5 is a flow chart of a third process 500 to convert unlabeled data into labeled data associated with an order according to some embodiments. The process 500 may convert a paragraph that includes address-related data to the fields 134(1) to 134(N) of FIG. 1. The process 500 may be performed by, for example, the server 104 of FIG. 1.

At 502, the process 500 may receive documents including a paragraph associated with an order, such as the paragraph 110 in FIG. 1. At 504, the process 500 may covert the paragraph into text, for example, using OCR or another technique. At 506, the process 500 may parse the text to identify an unlabeled field, for example, in the paragraph. The parsing may include the use of a parse tree, machine learning, at least a regular expression (i.e., Regex) match, or other suitable techniques. At 508, the process 500 may remove the unlabeled field from the text. At 510, the process 500 may convert the unlabeled field into a labeled field and store the labeled field in a data structure associated with the order. At 512, the process 500 may ask if there are more unlabeled fields that need to be identified, and, if yes, iterate the process of parsing, removing, and storing from 506 to 510. The labeled fields may include one or more of zip codes, states, cities, phone numbers, email addresses, company names, contact names, first address lines including house numbers and street names, and second address lines including a suite number, floor number, department number, or the like. At 514, the process 500 may validate one or more of the labeled fields. At 516, the process 500 may store the data structure associated with the order in a database. At 518, the process 500 may send the data structure to an order fulfillment facility, such as a built-to-order (BTO) facility 142 and built-to-ship (BTS) warehouse 144 in FIG. 1.

The parsing at 506 may assign a high probability that state names and city names may be found around where the zip code was found. For example, the parsing at 506 may look for state name and city name information close to where the zip code was found. In further embodiments, the parsing at 506 may identify additional address information (e.g., a suite number, floor number, department number, and the like) adjacent to where city names were identified. For example, the parsing at 506 may look for a suite number, floor number, department number, and the like close to where the city name was found.

The parsing at 506 may find first address line information based on a pattern having a house number and optionally directions (e.g., east/west/north/south (or E/W/N/S)) followed by street names (e.g., "1234 E Main Street"). Alternatively or additionally, the parsing at 506 may identify a street name and a street number (e.g., "1234 Main Street") by searching for one or more of street name keywords as exemplified below (a list of words are separated by |):

TE|STCT|DR|SPGS|PARK|GRV|CRK|XING|BR|PINE|CTS|TRL|V
I|RD|PIKE|MA|LO|TER|UN|CIR|WALK|CO|RUN|FRD|LDG|ML|A
VE|NO|PA|SQ|BLVD|VLGS|VLY|GR|LN|HOUSE|VLG|OL|STA|CH
|ROW|EXT|JC|BLDG|FLD|CT|HTS|MOTEL|PKWY|COOP|ACRES|E
STS|SCH|HL|CORD|ST|CLB|FLDS|PT|STPL|MDWS|APTS|ME|LO
OP|SMT|RDG|UNIV|PLZ|MDW|EXPY|WALL|TR|FLS|HBR|TRFY|B
CH|CRST|CI|PKY|OV|RNCH|CV|DIV|WA|S|WAY|I|CTR|VIS|PL
|ANX|BL|ST TER|DM|STHY|RR|MNR.

The parsing at 506 may identify contact name information based on one or more words from a list of contact name keywords (list of words are separated by |): ATTN|MARK FOR. For example, "ATTN: John Smith" may be identified as a contact name.

The parsing at 506 may identify company name information based on one or more words from a list of company name keywords (list of words are separated by |):

LTD|LLC|INC|SYSTEM|SCHOOL|CORP|COMMUNICATION|COMPAN
Y|SUPPLY|INSURANCE|FINANCE|UNIVERSITY|UNIV|NATIONAL
|BANK|DEPARTMENT|HEALTH|ADMINISTRATION|FIRM|DEVELOP
MENT|TECHNOLOGY|SERVICES|ENGINEERING|PRODUCTS|AGENC
Y|SOLUTIONS|SYSTEMS|INCORPORATED|INTERNATIONAL|MANA
GEMENT|SOFTWARE|WORKS|COMPANIES|GROUP|ACADEMY|TECHN
OLOGIES|COLLEGE|CITY|OFFICE|DEPT|CENTER|INTL|HOSPIT
AL|PROSECUTOR|HOSP|FARM|AGENCY|SOLUTIONS|COUNCIL|CO
UNTY|HEALTHCARE|MEDICAL|MARKETS|STUDIO|DATA|STARBUC
KS|PLANT|AUTOMOTIVE|CONNECTIONS|LOGISTICS|DISTRIBUT
ORS|CENTRAL|RECEIVING|COLLABORATORY|DIVISION|SERVIC
E|LLP|TECH|CONSTRUCTION|ELECTRIC|LABS|UNION|WHOLESA
LE|LIMITED|ENERGY|COMMUNITY|LABORATORIES|COURIER|AS
SOCIATES.

For example, "XYZ LTD." may be identified as a company name.

Figure 6:
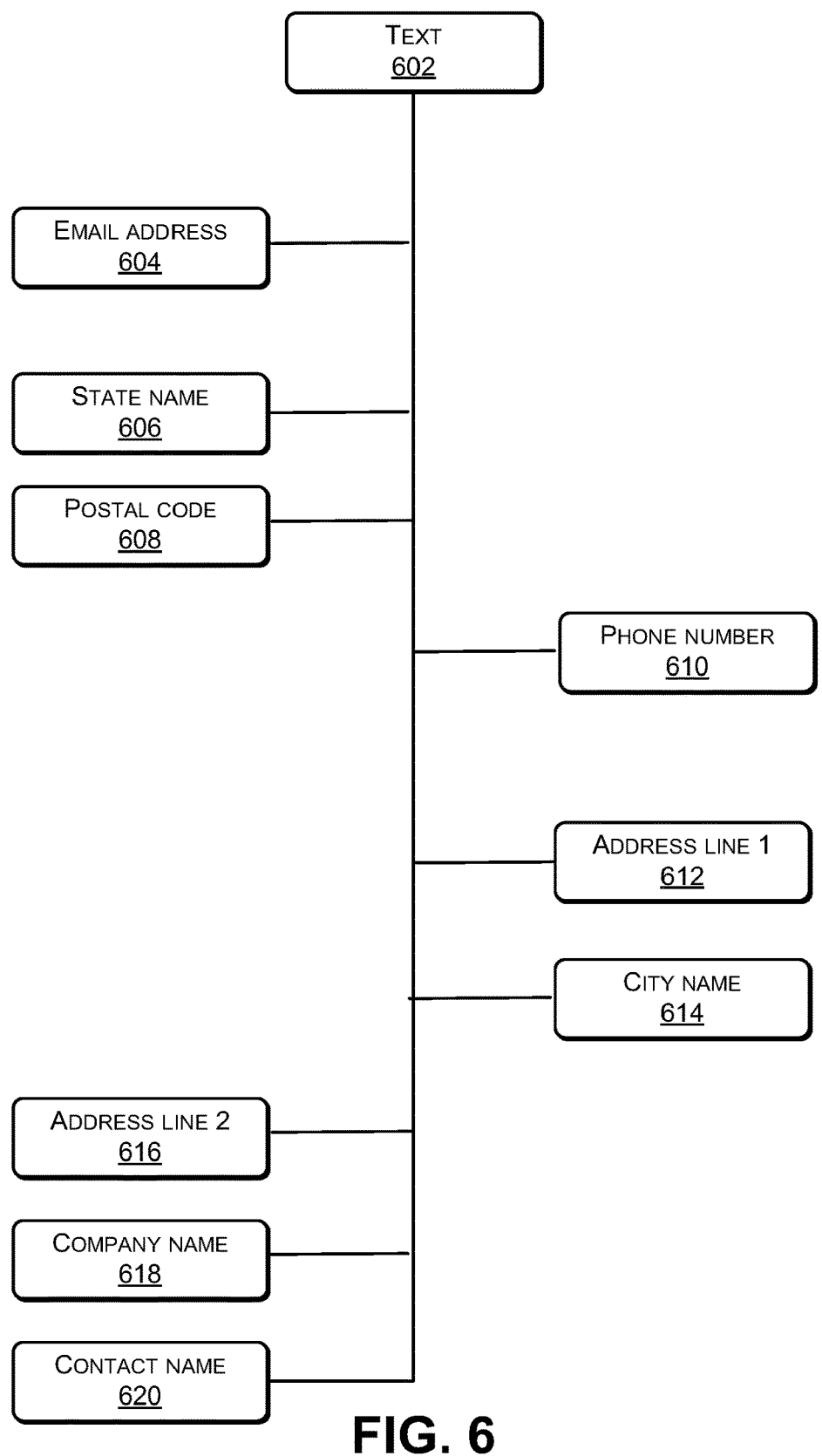
FIG. 6 illustrates a data structure of a parse tree according to some embodiments.

FIG. 6 illustrates a data structure of parse tree according to some embodiments. The server 104 in FIG. 1 may generate a parse tree to extract individual fields from a paragraph associated with an order according to some embodiments.

Text 602 may be converted from the paragraph 110, and may be used to construct a parse tree 600 as represented in FIG. 6. The parse tree 600 may include a node 604 associated with an email address, a node 606 associated with a state name (e.g., "TX") and a node 608 associated with a postal code such as a zip code (e.g., "78664"). The node 608 may be adjacent to where the node 606 is located. The parse tree 600 may also include a node 610 associated with a phone number (e.g., "503-123-4567"). The parse tree 600 may further include a node 612 associated with a first address line including a street number and a street name (e.g., "1234 Main Street"). The parse tree 600 may further include a node 614 associated with a city name (e.g., "Cincinnati"). The node 614 may be adjacent to where the node 612 is located. The parse tree 600 may further include a node 616 associated with a second address line including a suite number, a suite number, a department number, a floor number, a mail stop number, or the like (e.g., "Suite 100"). The parse tree 600 may also include a node 618 associated with the name of a company associated with the order (e.g., "XYZ company"). The parse tree 600 may include a node 620 associated with the name of a contact person who placed the order (e.g., "John Smith"). The node 616, 618, and 620 may be located adjacent to each other in the parse tree 600. All of the data in the parse tree may be converted into a plurality of tokens (e.g., "12000 W Road" may be represented by a token of "*12") to save memory space. A token, as used herein, may refer to a string or symbol with an assigned and thus identified meaning. For example, tokens may include symbols, parentheses, or operators (e.g., "+," ">," "=").

Thus, a computer system may be able to process address-related information in purchase orders and generate parse trees to convert unlabeled data to labeled data (e.g., contact name, company name, street address, state, postal code, email address, and the like).

Figure 7:
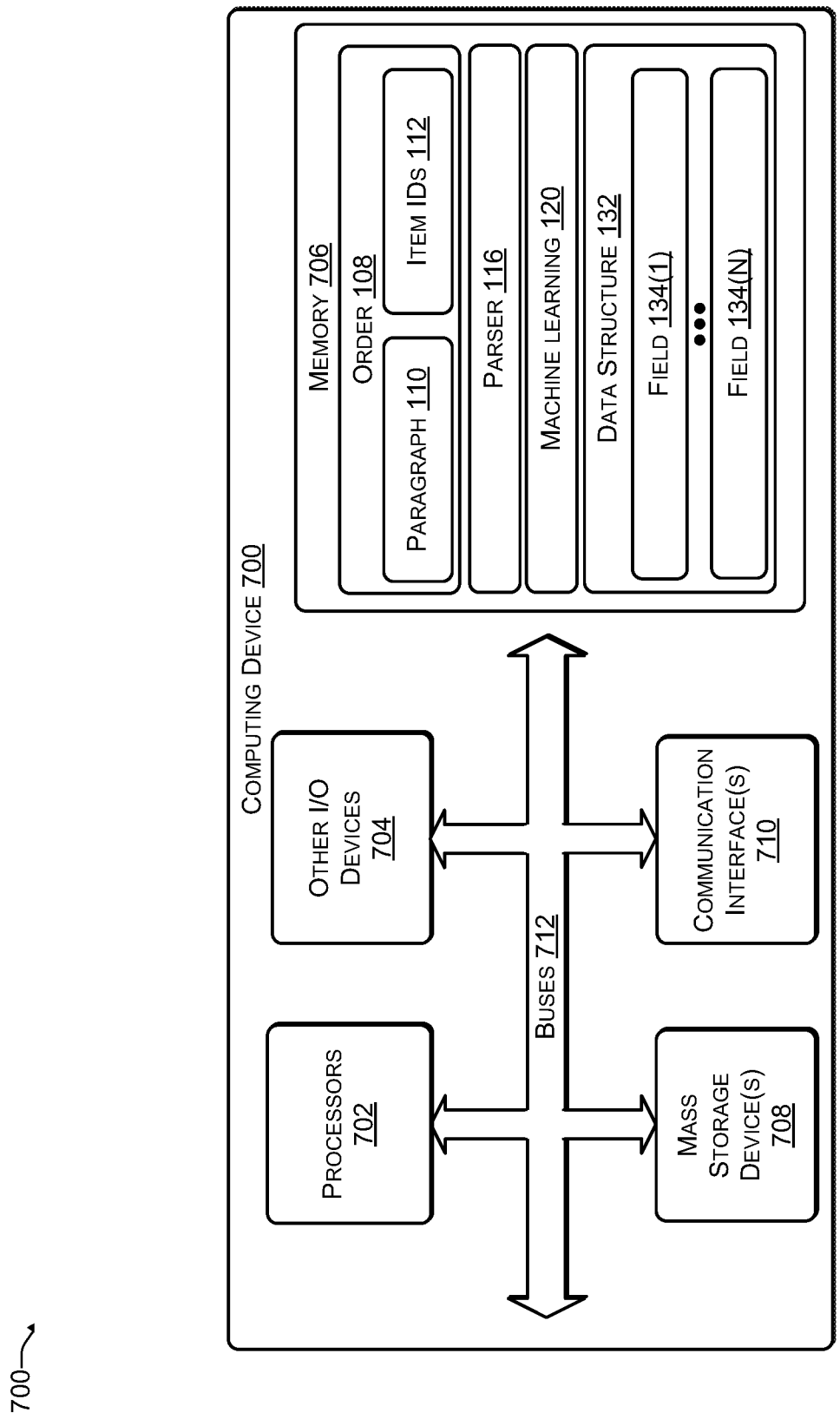
FIG. 7 illustrates an example configuration of a computing system that can be used to implement the systems and techniques described herein according to some embodiments.

FIG. 7 illustrates an example configuration of a computing device 700 that can be used to implement the systems and techniques described herein according to some embodiments. The computing device 700 may include one or more processors 702, input/output (I/O) devices 704 (e.g., keyboard, trackball, and the like), a memory 706, one or more mass storage devices 708 (e.g., including the memory 706), and communication interfaces 710 (e.g., including the I/O ports). These components may be configured to communicate with each other, such as via one or more system buses 712 or other suitable connections. While a single system bus is illustrated for ease of understanding, it should be understood that the system buses 712 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 702 are one or more hardware devices that may include a single processing unit or a number of processing units, all of which may include single or multiple computing units or multiple cores. The processors 702 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 702 may be configured to fetch and execute computer-readable instructions stored in the memory 706, mass storage devices 708, or other computer-readable media.

Other I/O devices 704 may be devices that receive various inputs from a user and provide various outputs to the user, and may include a keyboard, a touchpad, a mouse, a printer, audio input/output devices, and so forth.

Memory 706 and mass storage devices 708 may be examples of computer storage media (e.g., memory storage devices) for storing instructions that can be executed by the processors 802 to perform the various functions described herein. For example, memory 706 may include both volatile memory and non-volatile memory (e.g., RAM, ROM, or the like) devices. Further, mass storage devices 708 may include hard disk drives, solid-state drives, removable media, including external and removable drives, memory cards, flash memory, floppy disks, optical disks (e.g., CD, DVD), a storage array, a network attached storage, a storage area network, or the like. Both memory 706 and mass storage devices 708 may be collectively referred to as memory or computer storage media herein, and may be any type of non-transitory media capable of storing computer-readable, processor-executable program instructions as computer program code that can be executed by the processors 702 as a particular machine configured for carrying out the operations and functions described in the implementations herein.

The computing device 700 may also include one or more communication interfaces 710 for exchanging data via a network. The communication interfaces 710 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 710 can also provide communication with external storage, such as a storage array, network attached storage, storage area network, cloud storage, or the like.

The computer storage media, such as memory 706 and mass storage devices 708, may be used to store software and data. For example, the computer storage media may be used to store an order 108 including a paragraph 110 and associated item IDs 112. The computer storage media may also be used to store a parser module 118 and a machine learning module 116. A user may be able to use the parser module 118 and the machine learning module 116 to extract individual fields 134(1)-134(N) from the paragraph 110 and store the individual fields in the data structure 132 on the computer storage media.

Thus, methods, devices, and systems provided herein may provide a solution for digitizing offline purchase orders. Methods, devices, and systems provided herein may also improve the customer experience by processing orders faster, automating offline quality checks, and customizing order entry instructions. For example, methods, devices, and systems described herein may create completely automated frictionless order processing by reducing handle time from current standard processing average handle time of ten minutes per order to close to zero.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computer system comprising:
   one or more processors;
   one or more computer-readable storage media coupled to the one or more processors; and a plurality of instructions, stored on the one or more computer-readable storage media and executable by the one or more processors to perform operations, the operations comprising:

extracting information from a plurality of paragraphs associated with a plurality of respective purchase orders, wherein the plurality of paragraphs has inconsistent formats, and generating purchase orders from the plurality of respective purchase orders with individual labeled fields representing the information in a consistent format by:

receiving a document comprising a paragraph associated with a purchase order, wherein the plurality of respective purchase orders comprises the purchase order;

converting the paragraph into digital information containing text; and parsing the text to identify unlabeled data, to remove the unlabeled data, and to generate a data structure associated with the purchase order, wherein the generating comprises creating the data structure and populating the data structure with data, wherein the unlabeled data becomes labeled data by the populating the data structure, wherein the parsing comprises:

identifying, based on an email regular expression, an email address in the text;

removing the email address from the text;

adding the email address to an email field in the data structure;

identifying, based on a postal code regular expression, a postal code;

removing the postal code from the text;

adding the postal code to a postal code field in the data structure;

searching for digits in the text;

identifying a phone number from the digits in the text;

removing the phone number from the text;

adding the phone number to a phone number field in the data structure;

determining a street name and a street number in the text;

removing the street name and street number from the text;

adding the street name and street number to a first address field in the data structure;

determining a city name, a contact name, and a company name in the text;

removing the city name, contact name, and company name from the text;

storing the city name, contact name, and company name in the data structure, and generating a plurality of pre-determined number of fields in the data structure.

2. The computer system of claim 1, wherein converting the paragraph into text comprises:
using Optical Character Recognition (OCR) to convert the paragraph into text.

3. The computer system of claim 1, wherein parsing comprises:
identifying one or more delimiters in the text;
breaking the text into words based on the one or more delimiters; and
identifying a particular portion of an address associated with the purchase order based on the one or more delimiters.

4. The computer system of claim 1, wherein parsing comprises:
using a parse tree to identify a pre-determined number of fields.

5. The computer system of claim 1, wherein parsing comprises:
identifying, based on machine learning, a company name or a contact name.

6. The computer system of claim 1, wherein determining a city name, a contact name, and a company name in the text comprises:
using keywords associated with a city name, a contact name, or a company name to search the text.

7. The computer system of claim 1, wherein the operations further comprise:
determining that the paragraph is stored in a first size of computer memory;
determining that the pre-determined number of fields are stored in a second size of computer memory; and
determining that the second size is less than the first size.

8. A computer-implemented method comprises:
extracting information from a plurality of paragraphs associated with a plurality of respective purchase orders, wherein the plurality of paragraphs has inconsistent formats, and generating purchase orders from the plurality of respective purchase orders with individual labeled fields representing the information in a consistent format by:

receiving a document comprising a paragraph associated with a purchase order, wherein the plurality of respective purchase orders comprises the purchase order;

converting the paragraph into digital information containing text;

repeatedly parsing, by a parser, the text to identify a particular field from the text, wherein the particular field is unlabeled data;

removing the particular field from the text; and storing the particular field in a data structure associated with the purchase order, wherein the storing comprises creating the data structure and populating the data structure with data wherein the unlabeled data becomes labeled data by the populating the data structure;

until a pre-determined number of fields has been identified, removed, and stored.

9. The computer-implemented method of claim 8, wherein converting the paragraph into text comprises:
using Optical Character Recognition (OCR) to convert the paragraph into text.

10. The computer-implemented method of claim 8, wherein parsing comprises:
identifying, based on a phone number regular expression or one or more delimiters, a phone number in the text, the phone number comprising an extension of zero, three, four, or five digits.

11. The computer-implemented method of claim 8, wherein parsing comprises:
identifying, based on a pre-determined list of state names in full form and abbreviated form, a state name in the text.

12. The computer-implemented method of claim 8, wherein parsing comprises:
identifying, based on machine learning or a street name regular expression, a street name in the text.

13. The computer-implemented method of claim 8, wherein parsing comprises:
identifying words corresponding to spelling of numbers;
converting the words into digits; and
identifying a street number based on the digits.

14. The computer-implemented method of claim 8, wherein parsing comprises:
identifying, based on machine learning or a location regular expression, a floor number, a department name or number, a post office box number, a room number, a suite number, or a mail stop number.

15. One or more non-transitory computer-readable storage media to store instructions that are executable by one or more processors to perform operations, the operations comprising:
extracting information from a plurality of paragraphs associated with a plurality of respective purchase orders, wherein the plurality of paragraphs has inconsistent formats, and generating purchase orders from the plurality of respective purchase orders with individual labeled fields representing the information in a consistent format by:
receiving a document comprising a paragraph associated with a purchase order, wherein the plurality of respective purchase orders comprises the purchase order;
converting the paragraph into digital information containing text;
parsing, by a parser, the text to identify particular portions associated with a state name, a zip code, a city name, a street name and number, a phone number, an email address, a contact name, and a company name based on a pre-determined sequential order, wherein the particular portions are unlabeled data;
removing the particular portions from the text based on the pre-determined sequential order; and
storing the particular portions to fields in a data structure, wherein the storing comprises creating the data structure and populating the data structure with data wherein the unlabeled data becomes labeled data by the populating the data structure.

16. The one or more non-transitory computer-readable storage media of claim 15, wherein converting the paragraph into text comprises:
using Optical Character Recognition (OCR) to convert the paragraph into text.

17. The one or more non-transitory computer-readable storage media of claim 15, wherein parsing comprises:
identifying one or more delimiters in the text;
breaking the text into words based on the one or more delimiters; and
identifying one or more of the particular portions based on the one or more delimiters.

18. The one or more non-transitory computer-readable storage media of claim 15, wherein parsing comprises:
identifying, based on an email address regular expression, an email address in the text.

19. The one or more non-transitory computer-readable storage media of claim 15, wherein the pre-determined sequential order is as follows:
an email address;
a state name;
a zip code;
a phone number;
a contact name;
a street name and number;
a city name;
a floor number, a department name or number, a post office box number, a room number, a suite number, or a mail stop number;
a company name; and
a contact name.

20. The one or more non-transitory computer-readable storage media of claim 15, wherein the pre-determined sequential order is as follows:
a contact name;
a zip code;
a state name;
a city name;
a floor number, a department name or number, a post office box number, a room number, a suite number, or a mail stop number;
a street name and number;
a company name;
a contact name;
an email address; and
a phone number.

\* \* \* \* \*